United States Patent [19]
Layton et al.

[11] Patent Number: 5,181,851
[45] Date of Patent: Jan. 26, 1993

[54] FLASHOVER SIMULATION FOR FIREFIGHTER TRAINING

[75] Inventors: Mark R. Layton, Severna Park; Ramon L. Palmer, Jr., Cockeysville, both of Md.; Lester L. Smith, Shrewsbury, Pa.

[73] Assignee: AAI Corporation, Cockeysville, Md.

[21] Appl. No.: 703,101

[22] Filed: May 22, 1991

[51] Int. Cl.⁵ ............................................. G09B 19/00
[52] U.S. Cl. .................................................... 434/226
[58] Field of Search .............................. 434/226, 219

[56] References Cited

U.S. PATENT DOCUMENTS

| 3,675,342 | 7/1972 | Wolff | 434/226 |
| 3,675,343 | 7/1972 | Swiatosz et al. | 434/226 |
| 4,861,270 | 8/1989 | Ernst et al. | 434/226 |
| 4,983,124 | 1/1991 | Ernst et al. | 434/226 |

FOREIGN PATENT DOCUMENTS 9002393  3/1990  PCT Int'l Appl. .................. 434/226

OTHER PUBLICATIONS

"Simulator System Facilitates Training", Fire Engineering, vol. 139, No. 4, pp. 18 and 64 (Apr. 1986).
"Fire Trainer TM T-2000 Gas-Fueled Firefighter Training System", AAI Corporation (1990).
AAI Corporation reprint of D. Joynt and D. Kauffman, "Gas Fire Buildings-An Emergency Approach To Live Fire Training", originally published in Firefighter's News, Feb./Mar. 1991, pp. 38-41.
S. Sansone and S. Aroneo, "New Fire Simulator at FDNY Training Academy", W.N.Y.F. (With New York Firefighters), 2nd issue, pp. 8-11 (1987).
Handout entitled "Fire Fighting Trainer" for May 23, 1990 Fire Fighting Trainer Workshop at AAI Corporation.
Specification for Bucks County [Pennsylvania] Emergency Services Training Center, dated Apr. 4, 1990.
Specification for Rockland County [New York] Fire Training Center, dated May 17, 1990.
Japanese Patent Publication No. 2-114977, published Apr. 27, 1990, and partial English translation thereof.

Primary Examiner—Gene Mancene
Assistant Examiner—Cindy A. Cherichetti
Attorney, Agent, or Firm—Venable, Baetjer & Howard

[57] ABSTRACT

A system and method is disclosed for providing a simulation of a flashover condition that can occur during the course of suppression of a live fire. The flashover simulation is implemented by selectively supplying and igniting fuel to an auxiliary or flashover fuel burner assembly positioned adjacent the ceiling of the burn room of a firefighter trainer. Preferably, the flashover simulation is implementable only upon attainment of a threshold value of one or more pre-selected trainer operational parameters that are monitored throughout the course of a training scenario. Preferred trainer operational parameters for such monitoring include flame height at a main burner assembly and air temperature adjacent to or near a ceiling portion of the burn room.

26 Claims, 5 Drawing Sheets

SCENARIO NAME: ABC

|  | SET | OPTIONS |
|---|---|---|
| ▶ PREHEAT TEMPERATURE (°F) | 100 | 100-300 °F |
| MAXIMUM FLAME HT. (ft.) | 6 | 1-12 ft. |
| FLAME GROWTH TIME (sec) | 5 | 5-60 secs. |
| EXTINGUISH TEMP. LEVEL (°F) | 100 | 100-150 °F |
| FLASHOVER ENABLE | Y | Y/N |
| FLASHOVER-TEMP. (°F) | 200 | 100-300 °F |
| FLASHOVER-MAIN BURNER HT. (ft.) | 3 | 3-6 ft. |
| FLASHOVER BURN DURATION (sec.) | 8 | 5-10 secs. |

TRAINER COMPARTMENT NO.1

B₁
B₂

LEGEND:
▓ FLASHOVER BURNERS AVAILABLE
B# BURNER LOCATION(S)
▒ FIREPLACE LOCATION(S)

FIG.6

FLASHOVER SIMULATION FOR FIREFIGHTER TRAINING

BACKGROUND OF THE INVENTION:

1. Field of the Invention

The subject invention relates generally to fire simulation systems for training municipal, military, and other firefighter trainees as to the preferred procedures for suppressing and ultimately extinguishing fires. More particularly, the invention relates to a firefighter training system which is operable to produce an indication of a flashover as a consequence of improper fire extinguishing procedures on the part of the trainees.

2. Description of the Related Art

Conventional firefighter training practices typically provide for the combustion of flammable materials, such as wood, straw, and other organic and inorganic materials, which are to be extinguished by the trainee upon the application thereon of sufficient quantities of an appropriate extinguishing agent. The extinguishing agent that is most commonly utilized is water, due principally to its availability, cost and widespread usage as a fire extinguishing material. However, these conventional training practices have come under scrunity in recent years as a result of the relatively high injury rate, adverse environmental impact, and limited training effectiveness and trainee throughput that is associated with such practices. For example, the National Fire Protection Association (NFPA) reports that in the United States alone, nearly 6,000 training-related injuries were sustained by firefighters in 1988. Nevertheless, live fire training is a crucial and necessary component of firefighter training, for it most closely represents the overall environment a firefighter is likely to encounter during a genuine fire emergency. Unfortunately, conventional live fires that are set for the purpose of firefighter trainee education suffer from many of the very same hazards that are associated with genuine fire emergencies—unpredictability of fire propagation and its response to trainee action. As a consequence of these characteristics, it is oftentimes necessary for the trainee supervisors to themselves suppress the live fire prior to rendering perhaps life-saving assistance to a fallen trainee. Furthermore, because the very nature of a conventional live fire is unpredictability, it is not possible to accurately and readily reproduce a desired fire condition for a succession of firefighter trainees.

In an effort to address the foregoing deficiencies in firefighter training, live fire simulator systems have been implemented since the early 1970's which provide for, among other features, the substitution of various controllable arrangements of propane and natural gas-operable burners located within dedicated "burn rooms" for the prior practice of igniting various flammable props (i.e., wood or straw bundles) or even buildings to be razed. Illustrative of the newer generation of live firefighter training simulators is that disclosed in U.S. Pat. No. 4,303,396 and assigned to the United States of America as represented by the Secretary of the Navy. The simulator disclosed in this referenced patent, which is hereby incorporated by reference, provides a plurality of chambers, each of which can be provided with a fire from a fuel burner that is representative of a variety of different types of fires. This simulator is useful in educating firefighter trainees as to some general principles of fire extinguishment, such as spray nozzle control and various extinguishing agent application techniques. However, it does not simulate certain "real life" fire situations, such as flashover, that a firefighter may encounter during the course of combating of a genuine fire emergency of the type that can be present in a generally enclosed space. As used herein, the term "flashover" refers to the spontaneous combustion and/or explosion of heated gases which collect adjacent the ceiling of a room as a consequence of the various gases emitted from burning material having attained their flash point temperatures. Flashover manifests itself in the form of a fireball which explodes downwardly from the ceiling to the floor. As the fireball can attain temperatures in excess of 1,000° F. (538° C.), which is far greater than the temperature at which conventional firefighter survival suits are rated, the occurrence of a flashover is oftentimes fatal to all personnel in the vicinity of the fireball. Additionally, the concussive effect of the downward explosion of the fireball can disable personnel not in the immediate vicinity of the flashover.

Because flashover can have such a profound impact on the health, safety and performance of firefighters, it is desirable to properly educate firefighters as to the fire extinguishing techniques which are successful in preventing flashover from occurring in the first instance. One commonly used method for inhibiting the occurrence of flashover is to periodically spray with water the ceiling of the room in which the fire is present, thereby cooling the gases located adjacent to the ceiling.

Efforts to incorporate flashover precursor simulation in prior live fire simulators have not been entirely successful and can present unduly hazardous conditions for trainees. For example, an attempt has been made to provide flashover prevention training by monitoring generally the manner in which water is applied to the fire. In instances where improper watering techniques are used, the fire is made to expand and rollover conditions are caused to develop three to five feet (1-1.5 m) across the ceiling. Unfortunately, this can give rise to hazardous conditions in the event that the trainees are in undesirably close proximity to the burners.

In view of the foregoing limitations of the prior art, it is an object of the subject invention to provide a flashover simulation for firefighter training which is operable in a highly controllable manner and to provide a visual, aural and thermal indication of flashover once predetermined conditions have been met.

A further object of the subject invention is to simulate flashover arising from a variety of different fire types and occurring when a variety of different extinguishing agents, such as water, foam, $CO_2$ and other agents, are in use.

Yet another object of the subject invention is to provide flashover simulation for firefighter training which is responsive to a range of variable user-selectable parameters.

These and other objects and advantages will become apparent from a reading of the following detailed description of the preferred embodiment

SUMMARY OF THE INVENTION

A system and method is provided for simulating flashover during a live firefighting training exercise. The education of firefighter trainees as to the precursor conditions which give rise to flashover and the fire suppressing practices that can be implemented on the part of firefighters to avoid flashover is of considerable importance, as flashover, once it occurs, is oftentimes harmful, and even fatal, to the personnel in the vicinity of the event.

In one aspect of the invention, a flashover simulation system is provided for use with a firefighter trainer having a main burner that is mounted within a generally enclosed burn room. The flashover simulation system includes at least one auxiliary or flashover burner that is positioned adjacent to a ceiling portion of the burn room. The auxiliary burner is operable to burn fuel that is supplied to it from a fuel reservoir to provide the flashover simulation. A fuel ignitor is positioned adjacent the auxiliary burner and is operable to generate, preferably in a continuous manner, fuel ignition output to the auxiliary burner. A control system is operable to effect fuel delivery to the auxiliary burner, preferably for a prescribed interval of time, independently of fuel delivery to the main burner. The control system can include, for example, a valve assembly such as a motorized linear valve, for providing a variable control of fuel delivery to each of the main and auxiliary burners independently of one another.

A preferred aspect of the flashover simulation system provides for the monitoring of at least one firefighter trainer operational parameter and the generation from the control system of a flashover enablement signal after the monitored operational parameter has attained or exceeded a pre-selected threshold value. The preferred operational parameters are main burner flame height and the temperature of air adjacent or near the burn room ceiling. Preferably, both operational parameters are monitored and the flashover enablement signal is generated only after the respective pre-selected threshold values have been substantially simultaneously attained. Optimally, at least one of the respective threshold values is operator selectable from a prescribed range of such values and can be applied as an input to the control system.

Because the combustion of fuel is inherently dangerous, it is desirable to transmit the flashover enablement signal to a flashover actuation switch which is selectively operable by supervisory personnel that are preferably on-site at the burn room. In this fashion, supervisory discretion can be exercised in determining the appropriateness of the flashover simulation under the totality of circumstances existing in the burn room during the training scenario. Such circumstances can include, for example, trainee experience and composure during the training scenario, as well as their proximity to the main and auxiliary burners. However, the flashover simulation system can also be configured to provide for automatic (i.e., non-discretionary) flashover simulation implementation, particularly when the monitored operational parameters are within acceptable ranges of operation.

In another aspect of the invention, a method is provided for simulating flashover in a firefighter trainer of the type having a main burner mounted within a generally enclosed burn room. The novel method provides for selectively enabling a flow of combustible fuel to an auxiliary or flashover burner while a fuel ignitor positioned adjacent to the burner is in operation to direct a flame near the ceiling of the burn room. Preferably, the fuel flow is enabled only after a predetermined threshold value for at least one monitored operational parameter for the firefighter trainer has been attained. Preferred operational parameters for monitoring include main burner flame height and the temperature of air adjacent to a portion of the ceiling of the burn room. Ceiling temperature is preferably sensed by a thermocouple which provides an output signal indicative of sensed temperature to a control unit such as an automatic processing unit.

BRIEF DESCRIPTION OF THE DRAWINGS

FIG. 2 is a perspective side view illustrating details of a portion of one of the compartments of the trainer depicted in FIG. 1;

FIG. 6 is an illustrative sample of an operator console screen display that can be generated incident to the practice of the subject invention.

DETAILED DESCRIPTION OF THE PREFERRED EMBODIMENTS

Figure 1:
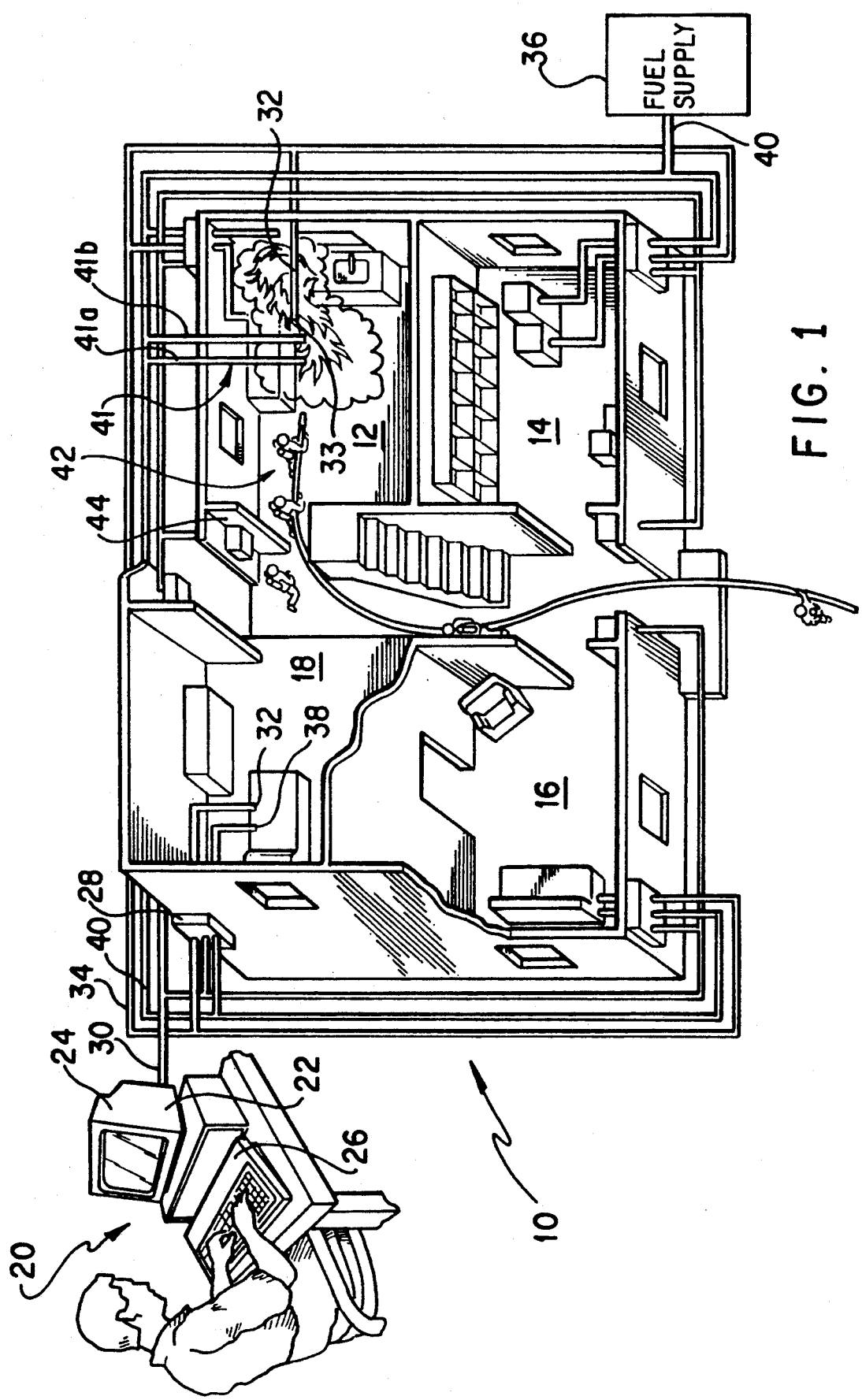
FIG. 1 is a schematic overhead view of a multi-compartmented firefighter trainer in accordance with the subject invention.

With reference to the drawings, wherein like reference characters represent corresponding parts throughout the various views, and with particular reference to FIG. 1, there is depicted a multi-compartmented firefighter trainer in accordance with the principles of the subject invention, designated generally by reference character 10. The trainer is comprised generally of a plurality of compartments or chambers 12, 14 16 and 18, each of which is independently operable and controllable in the manner described below by a master processing unit 20 which may comprise a personal computer, workstation, or the like. However, it is to be understood that the principles of the subject invention are equally applicable to firefighter trainers having only a single compartment or "burn room". As shown in the drawing, the master processing unit 20 comprises a central unit 22 which includes a central processing unit (CPU) and at least one disk drive, a display screen 24 such as a CRT, and a suitable data input device 26 such as a keyboard and/or manual input device (e.g., "mouse"). The master processing unit 20 can be positioned remote from the compartments 12, 14, 16 and 18 and is operable to communicate in a "master/slave" relationship in the manner described below, as indicated by control line 30, with a local automated processing unit 28 that is preferably associated with one or more of the compartments in which a fire simulation is to be conducted. The local processing unit 28 provides control signal inputs to the various devices such as fuel inlet valves, smoke generators and emergency fire suppression and ventilation apparatus described below. Data regarding the operability and/or performance of the apparatus controlled by the local processing unit 28 is conveyed to the master processing unit 20 along the control line 30. Additionally, data sensed by various sensors, such as compartment ceiling temperature sensors 32, is communicated to the local processing unit 28 along sensor data line 34 for processing after which the processed sensor data can be communicated to the master processor 20 for display to the operator. Fuel such as propane or natural gas is housed within a suitable storage tank 36 and is supplied to main gas burner units 38 within the compartments through fuel supply lines 40. Signal inputs are received at the local processing units 28 for opening the appropriate fuel control valves associated with a given burner in the compartment 12, 14, 1 or 18 in which a training exercise is to be conducted. Fuel can also be supplied to the overhead flashover burner unit 41 in a similar manner upon the occurrence of pre-established criteria applied as inputs through the data input device 26, as described in detail below. The flashover burner unit preferably comprises two elongated, cylindrical burners 41$a$ and 41$b$, positioned in spaced-apart relation with one another so as to produce, upon burner ignition, a flame spread generally parallel to the ceiling. As indicated in the drawing, the preferred embodiment of the subject invention permits a firefighter crew, indicated in the drawing generally by reference character 42, preferably under the watchful eye of one or more supervisory personnel positioned behind an observation or fire wall 44, to advance through the trainer 10 to a specific one or more of the trainer compartments, such as compartment 12, to combat a live fire therein generated by the main burner assembly 38 in a manner well known in the art.

Further details of the flashover simulation apparatus of the subject invention are depicted in FIG. 2. With reference to the drawing, a firefighter crew 42 is shown applying an extinguishing agent such as water, foam, powder or $CO_2$ gas to a fire at the main burner assembly 38. In a manner well known in the art, the fire at the burner 38 can be optionally controlled to simulate various types of fires such as wood, chemical, electrical and grease fires. The extinguishing agent 46 can optionally be collected at a funnel 48 formed in the floor grating 50 for conveyance to, for example, one or more detectors 52 for analysis as to volume and/or composition. Results of the analysis can ultimately be reported to the trainees and supervisor for critiquing as to, for example, the quantity and/or appropriateness of the extinguishing agent applied to the fire. In this regard, it is well known that particular extinguishing agents are more appropriate than others for extinguishing certain types of fires. For example, water is generally regarded as an inappropriate extinguishing agent for application to grease fires and can, in fact, exacerbate such fires. Obscuration of the trainees' vision in a manner likely to be encountered in a genuine fire emergency can optionally be provided by suitable smoke generating apparatus (not shown), such as that described in co-pending patent application Ser. No. 07/707,868 filed on May 31, 1991 and assigned to the assignee of the subject invention, that are capable of producing simulated smoke through inlet vents 54.

The flashover burners 41 are positioned adjacent to the compartment ceiling 56, preferably at a height level of at least about 60% of the height of the room in the vicinity of the fire simulation. For example, placement of the flashover burners 41 at a height of from about 2 ft. (e.g., for crawl space-or drop ceiling-type simulators) to about 15 ft. above the compartment floor 50 is optimal. The burners can be suspended from the ceiling by suitable brackets 57, or can be arranged so as to extend from one of the compartment sidewalls 58, the burners being supported along their length by the above-referenced brackets. The flashover burners 41 are preferably positioned above the portion of the floor 50 where firefighters are likely to take positions in combating a live fire emanating from the main burner assembly 38. Preferably, the flashover burners 41 are adapted to burn the same fuel as that supplied to the main burner assembly 38. The burners 41$a$ and 41$b$ are preferably arranged so as to provide a broad, substantially even flame distribution from the burner nozzles 60 thereof (upon burner enablement and ignition in the manner described below) along a path generally parallel to the ceiling. Flame distribution along the ceiling rather than downward toward the firefighters in the compartment 12 is preferred so as to ensure safety of the personnel within the compartment. A suitable burner can be obtained by providing a row of $\frac{1}{8}$-inch apertures spaced about every 2 inches along a 2-inch diameter pipe. As the principal purpose of the flashover simulation is to provide a graphic and memorable visual, aural and thermal indication of the occurrence of a flashover event, rather than an additional fire to be suppressed by the firefighters 42 assembled in the simulator compartment, the flashover burners are preferably operable for only a brief, preselected interval of time, such as from five to ten seconds. The flashover burners 41$a$ and 41$b$ are preferably ignitable by spark ignitors 61 that are positioned preferably adjacent the fuel inlet end 64 of each burner. The ignitors 61 are operable, preferably continuously, throughout the live fire training exercise, to emit a spark as shown in the drawing toward the flashover burners so as to ignite fuel supplied thereto upon flashover enablement and implementation as described below. A suitable spark sensor 65, such as an ultraviolet (UV) sensor, is provided adjacent to the ignitors 61 to monitor spark emission from the ignitor. A similar arrangement of ignitors 62 and ignitor sensors 66 is provided at the main burner assembly 38. As is described in detail in the specification which follows, fuel is not to be supplied to the flashover burners 41 unless spark emissions from the ignitor 61 are detected by the detectors 65, thus ensuring that unignited flammable fuel is not emitted by the flashover burner to descend and possibly spontaneously ignite in the vicinity of the firefighters 42. The foregoing confirmation of spark emissions is especially important when propane is employed as a burner fuel, as propane is heavier than air and would therefore descend upon the firefighters assembled within the compartment and possibly ignite into a fireball, absent provision of the foregoing safeguard, following its emission from the burner nozzles 60.

Figure 3:
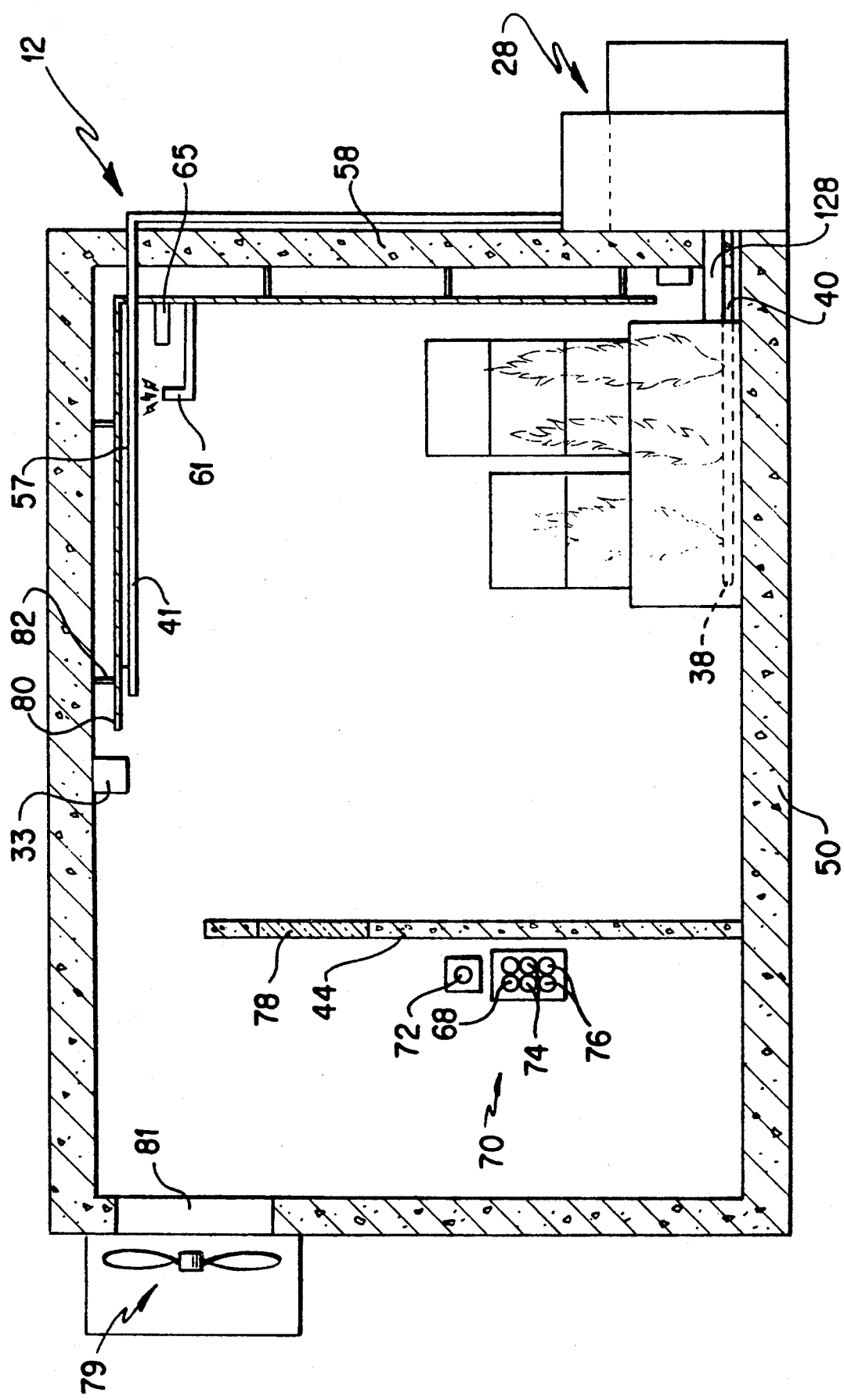
FIG. 3 is a sectional side view of an illustrative compartment of a firefighter trainer in accordance with the subject invention.

As noted previously, flashover occurs when gases collecting adjacent to the ceiling of an enclosure attain their flash points. The flash point will vary in accordance with the chemical composition of the gases in the ambient air and those emitted from the material (wood, chemicals, and so on) that has been consumed by the fire. Typically, the flash point can be expected to range from about 900° F. to about 1200° F. In the flashover simulation of the subject invention, the temperature of the gases which have collected adjacent to the ceiling of the simulator compartment 12 is detected by a suitable ceiling temperature sensor 32. The preferred form of ceiling temperature sensor is a thermocouple 33 which preferably provides an operational range that encompasses at least a portion of the range genuine ceiling temperatures that are typically encountered in the simulator. A suitable thermocouple for use in the flashover simulation of the subject invention is the model K23096G-10A-06 manufactured by Pyromotion, Inc. of Fort Wayne, Ind. The thermocouple 33 is positioned at the end of a support rod 67 that preferably extends from a sidewall 58 to the ceiling area where heated gases are likely to collect during operation of the firefighter trainer compartment at a height of from about 2 ft. to about 15 ft. above the compartment floor 50 in accordance with the nature and size of the simulator compartment (e.g., drop-ceiling/crawl space or full room-size simulator). Suitable support brackets 69 extending from the ceiling are provided to maintain placement of the thermocouple 33 in the desired position. Temperature data obtained from the thermocouple is conveyed along appropriate data lines 34 (FIG. 1) and converted by appropriate analog-to-digital (A/D) converter circuitry prior to delivery to the local processing unit 28 for processing in the manner set forth below and communication to the master processing unit 20. Once the pre-established flashover parameters have been attained, a flashover enablement signal is transmitted from the master processing unit 20 (through local processor 28) to an activation switch 68 at an on-site control panel 70 located behind the firewall 44. With reference to FIGS. 2 and 3, the activation switch 68, as well as the various other control switches (such as emergency off 72, pause on/off 74 and smoke on/off 76), are preferably provided with unique coloring and/or backlighting to facilitate their visualization throughout operation of the fire simulation exercises. A viewing port or window 78 is preferably provided in the firewall 44 to permit the supervisory personnel stationed behind the firewall an unobstructed view of the progress of the firefighter training scenario. Supervisory personnel are preferably present at the control panel 70 throughout the training exercise to oversee all activities within the compartment 12 and to exercise supervisory control over the conduct and progress of the training exercise. If, in the discretion of the supervisory personnel, flashover (once enabled) can be safely and effectively implemented, the flashover activation switch 68 can be engaged by one of the supervisory personnel, thereby effecting the supply of fuel from the reservoir 36 to the flashover burners 41 for ignition by the associated ignitors 61 and propagation of the ensuing flame in the manner described above. As noted previously, the conditions which give rise to flashover enablement can be inhibited, and even prevented altogether, by periodically spraying the ceiling of the compartment 12 with the extinguishing agent 46, thereby cooling the gases which have collected near the room ceiling. An insulative liner 80 (FIG. 3) is preferably provided adjacent to the respective portions of the compartment ceiling and sidewall which are likely to receive extinguishing agent so as to protect the compartment ceiling and sidewalls from the deleterious affects of repeated, sudden and extreme temperature changes. The liner can be formed from mild steel or "Corten" steel, manufactured by USX Corp. of Pittsburgh, Pa., and is removably mounted to the ceiling and sidewalls by conventional brackets 82. Smoke and heat can be exhausted from the compartment by one or more exhaust fans 79, which are operable to draw these trainer byproducts through a corresponding aperture 81 formed in a sidewall of the compartment.

Figure 4:
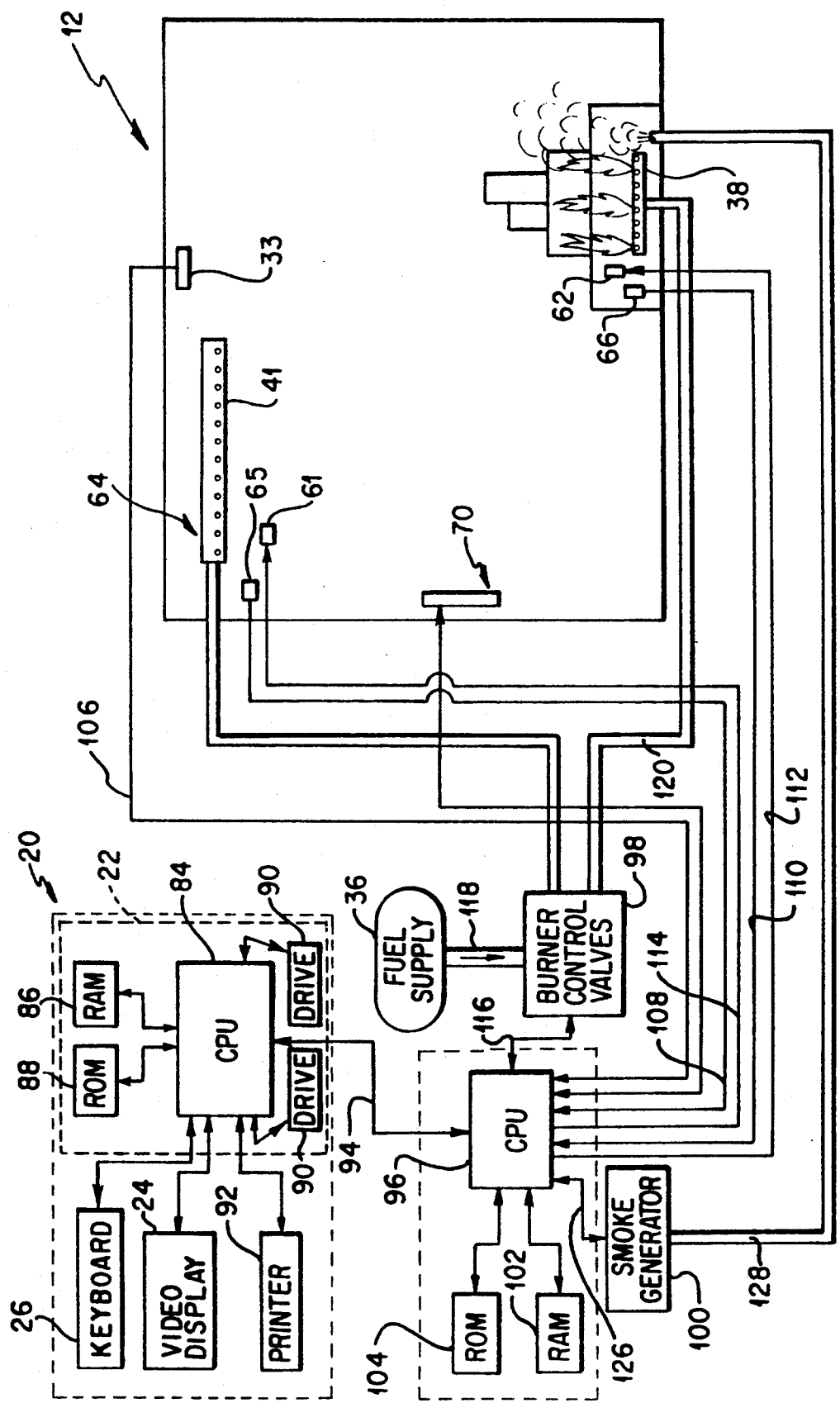
FIG. 4 is a schematic diagram of a firefighter trainer compartment and control system therefor in accordance with the subject invention.

Details of the electromechanical control apparatus for the flashover simulation of the subject invention are illustrated in FIG. 4. With reference to the drawing, the master data processing unit 20 is in the form of a personale computer or workstation. Operation of the processing unit 20 is controlled by a central processing unit (CPU) 84, such as the model SB286SC marketed by Industrial Computer Source, Inc. of San Diego, Calif. A random access memory (RAM) 86 is electrically connected to the CPU and stores OSS software and provides working memory for the CPU. A read-only memory (ROM) 88 is also provided which stores various programs that are needed for input/output, power-up, self-test diagnostics, and booting procedures for the CPU 84. One or more disk drives 90 can be provided to interface with the CPU 84. The above-referenced video monitor 24 (FIG. 1) and data input apparatus, such as the keyboard and/or mouse 26, are provided to permit human operator interaction with the CPU 84. A printer 92 can optionally be connected to the CPU 84 to provide a hard copy of the data related to the flashover simulation, such as graphics and/or tabular data relating thermocouple temperature, quantity of extinguishing agent applied during the training exercise, and flame height at the main burner assembly 38 as a function of time. Alternatively, such data can be stored in RAM 86 for subsequent recall and display to the trainee(s) at one or more console monitors 24.

The master processing unit 20 is coupled to the local processing unit 28 at the facility (also known as a "burn building") which houses the one or more trainer compartments by way of a bidirectional data, address and control bus 94. Preferably, a single, dedicated local processing unit 28 having all of the features specified below is provided adjacent to one or more of the plurality of trainer compartments, a data bus extending between the processors of the respective processing units. More particularly, the CPU 84 of the main processing unit 20 is coupled to the CPU 96 of the local processing unit 28. As is the case with the master processing unit 20, the local processing unit 28 includes suitable programming and hardware interfaces for communicating with and controlling various hardware devices. These devices include the fuel burner control valves 98 and smoke generator 100 that are associated with the firefighter training simulator of the subject invention, as well as A/D converter apparatus that allows the processor to receive and interpret signal inputs received from the thermocouple 33. Preferably, outputs from the ignitors 61 and 62, and UV sensors 65 and 66 are in the form of digital data for direct transmission to the CPU 96.

The CPU 96 of the local processor unit is connected to the various sensor and hardware devices associated with each simulator compartment, such as compartment 12 illustrated in FIG. 4. For example, the CPU 96 receives temperature sensor input (following processing by appropriate A/D converter apparatus, not shown) from the thermocouple 33 along data line 106. Data from the main burner and flashover UV sensors 65 and 66 relating respectively to operation of the main burner and flashover ignitors 61 and 62 is transmitted to the CPU 96 along data lines 108 and 110, respectively, whereas ignition signal input to the corresponding ignitors are transmitted along communication lines 112 and 114. Fuel is conveyed under pressure from tank 36 to the main burner unit 38 and optionally the flashover burner unit 41, upon receipt by the burner control valve system 98 of appropriate signal commands transmitted along communication line 116. The valve control system includes a valve assembly, such as the series 1800-MLV motorized linear valve manufactured by Ben Metzger, Inc. of Perry, Ohio, that is mounted in an independently controllable manner within the fuel flow path to each of the respective flashover and main burner units. Upon receipt of appropriate signal input from the CPU 96, the valve control system 98 is operable to bias the fuel control valves between a closed position and an open position so as to allow for precise metering of fuel under pressure from the tank 36 (through conduit 118) and into a corresponding one of the burner fuel supply lines 120 and 122 for delivery to the burners 38 and 41, respectively. A suitable connector, such as a "T" or "Y" connector (not shown), is provided along the flashover burner supply line 122 to split the flow of fuel substantially evenly to the two flashover burners 41a and 41b. Flashover enablement and other local control panel 70 control input (i.e., for emergency stop, pause on/off, smoke on/off, and so on) is communicated between the CPU 96 and local control panel along communication line 124. CPU 96 control of the smoke generator 100 is implemented along communication line 126. Upon receipt of an activation signal input from the CPU 96, smoke, which is preferably of the simulated, non-toxic variety such as that produced by the smoke generator disclosed in commonly-assigned U.S. patent application Ser. No. 07/707,868 entitled Method and Apparatus for Controllably Generating Simulating Smoke filed on May 31, 1991, the disclosure of which is expressly incorporated by reference, is conveyed along conduit 128 to the main burner assembly 38 or any other suitable outlet within the trainer compartment for the purpose of further enhancing the realism of the simulation. The CPU 96 can be operated in a manner well known to persons of ordinary skill in the art to control any of a variety of other simulator components, such as compartment ventilation, lighting, and other hardware. Signal data relating generally to the enablement, status and control of the foregoing hardware components discussed above is exchanged between the local and main processing systems along the data bus 94, thereby minimizing the complexity of communication and control exchanged between these two processing systems. The foregoing communication and control hierarchy is further advantageous in situations where the master processing unit 20, for any of a variety of reasons, is not located on-site at the burn building.

Figure 5:
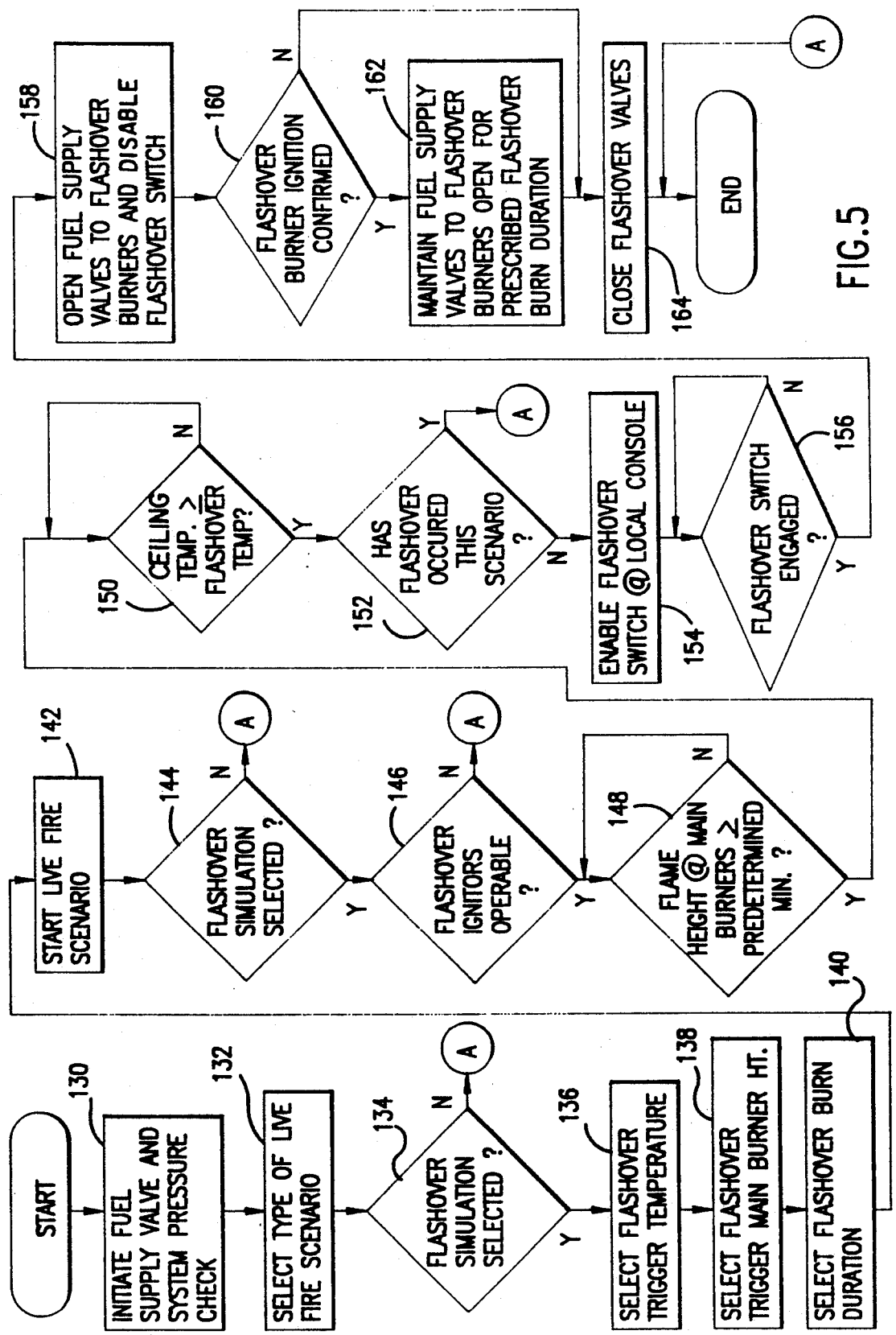
FIG. 5 is a flow diagram of the flashover simulation control logic for the firefighter trainer in accordance with the subject invention.

Details of the program control for the flashover simulation of the subject invention are set forth in the flow diagram of FIG. 5. Prior to the implementation of the training exercise, the CPU 84 commands the CPU 96 to initiate a test of the fuel pressure and fuel control valves 98 in order to confirm their operability, as indicated by block 130. This test is accomplished by CPU 84 accessing of appropriate program data stored in RAM 86, as described above, resulting in generation of an appropriate input signal to the CPU 96 of the local processing unit 28 on-site at the trainer compartment at which the firefighter training exercise is to be undertaken. The test is implemented upon accessing by the CPU 96 of test-related program data stored in RAM 102 in a manner known in the computer art, which effects signal output from the CPU 96 along communication line 116 to command the hardware at the control valve assembly 98 to undergo a prescribed regimen of openings, closings and system pressure checks. This pre-implementation test can further encompass test-firing of the respective burner ignitors 62 and 61 and the monitoring thereof by the UV sensors 66 and 65 associated with the respective ignitors by means of signals exchanged with the CPU 96 along the respective communication lines 112 & 114 and 108 & 110. Upon satisfactory completion of the pre-implementation test procedures, the main processing unit 20 prompts the console operator, as indicated by blocks 132 through 138, for entry of the appropriate fire simulation parameters for the training exercise. An illustrative example of the operator console prompt is illustrated in FIG. 6. Once the various desired simulation parameters have been entered (through the keyboard and/or mouse input 26), the training scenario can proceed. In the preferred embodiment, the operator console generates prompts for flashover trigger temperature (block 136), main burner height flashover trigger (block 138) and burn duration selection (block 140) only in the instance where the flashover simulation has been selected. However, for the sake of illustration, options for the selection of these respective parameters have been included in the operator console screen representation depicted in FIG. 6. The flashover prompts indicated by blocks 136 and 138 are preferably not generated at the console in instances where flashover simulation has not been elected.

Following entry of the respective training scenario parameters, the training scenario is initiated, as shown at block 142. In instances where the flashover simulation has been selected (see block 144), the operability of the flashover ignitors 61 is confirmed (block 146) by the local processing unit 28 in the manner described above (i.e., by monitoring signal output from UV sensors 65). Upon confirmation of ignitor operability at the local processor 28 and transmission of this data along bus 94 to the main processing unit 20, the flame height at the main burners 38 is monitored (block 148) in a conventional manner, as can be accomplished by monitoring the valve position (i.e., percentage of valve aperture opening as transmitted by the referenced valve) or, alternatively, by monitoring the quantity of gas flow to the burners by means of a conventional in-line fuel flow gauge. In either case, a determination is made as to whether the main burner flames have met or exceeded the pre-selected flashover triggering height. Main burner flame height is preferably continuously monitored, as an underlying assumption for the flashover simulation is that flashover ordinarily does not occur in fire emergencies unless the flames have attained a certain minimum height necessary for the fire to generate sufficient thermal energy to elevate the temperature of gases which collect adjacent to the ceiling to the collective gas flash point. With reference to FIG. 6, the main burner flashover trigger height that has been selected for the illustrative scenario is 3 ft., although any of the other height values provided in the prompt can be substituted therefor in accordance with such varied factors as the proficiency and experience of the trainee(s) and the type of fire to be simulated (wood, chemical, grease, and so on).

Once the main burner flames have attained the predetermined threshold height, temperature data continuously received from the thermocouple 32 along data line 124 is evaluated by CPU 96, as indicated by block 150, to ascertain whether the preselected flashover temperature has been attained. Ceiling temperature data is preferably continuously monitored throughout the training scenario until its completion. Once the preselected main burner flame height and ceiling temperature values have been attained, the flashover simulation can be implemented. However, because little or no training value is obtained by repetitively generating the flashover simulation during a single training scenario, it is desirable to confirm that flashover has not been produced up to that time in the scenario, as indicated by decision block 152. In instances where flashover simulation has previously occurred during the scenario, the scenario proceeds without flashover again occurring. In the event that flashover simulation has not yet occurred during the ongoing scenario, the local processsor 28 generates an enablement signal to the flashover activation switch 68 at the local control panel 70, as denoted by block 154. Switch activation is preferably indicated at the local control panel by switch illumination, audible means, and/or a combination of these respective types of indicia. The preferred embodiment of the flashover simulation of the subject invention provides the fire training supervisor (who is preferably positioned adjacent to the control panel 70) with discretion as to whether or not a flashover simulation, following switch enablement, is to ensue. Such an arrangement (as opposed to fully automatic flashover simulation generation upon attainment of the preselected parameters referenced above) affords a degree of further safety to the conduct of the training scenario, as instances can arise where it is highly undesirable to proceed with flashover simulation, even when the pre-established flashover conditions have been fully satisfied. Examples of such situations include panic on the part of the trainees within the compartment, undesirable physical trainee proximity to the flashover burners, and failure of equipment such as firefighter protective gear. It is therefore preferred to include human supervisory input as an aspect of flashover simulation. However, it is to be appreciated and understood by persons skilled in the art that a fully automated (i.e., non-discretionary) flashover simulation process, in which flashover simulation proceeds automatically upon attainment of the foregoing flasher simulation parameters (see blocks 136-140 above), is within the scope of the subject invention.

The status of each of the local console selection switches, including the flashover activation switch, is continuously monitored by the local processor 28 throughout the scenario, as indicated by block 156. With reference to flashover simulation, once the flashover activation switch 68 has been engaged by the trainee supervisor, the CPU 96 generates an appropriate command to the flashover burner control valves of the valve assembly 98 to open, thereby providing for the delivery of fuel into conduit 122 and the flashover burners 41a and 41b for ignition by the associated ignitors 61. Once flashover burner ignition has optimally been confirmed by appropriate signal data received by the CPU 96 from the UV detectors 65 (block 160), the flashover burner control valves are maintained open for the prescribed flashover burn duration, as indicated by block 162, after which the valves are commanded by the CPU 96 to close (block 164). Similarly, in the event that flashover burner ignition confirmation has not been received from the UV sensors 65, the CPU 96 is preferably operable to command the flashover valves to close so as to minimize the release of unignited fuel through the flashover burners. Minimization of such uncombusted gas release is especially important in instances where fuels such as propane, which is heavier than air and will therefore tend to descend toward ground level, are utilized, as the presence of an unburned aggregation of fuel within the compartment could pose an undue health and safety risk to the trainees, exposing them to envelopment by fire. Once the flashover burner control valves have been closed, the scenario proceeds to main burner fire extinguishment, interruption by supervisory personnel at the local control panel or operator console, or automatic system shut-down upon receipt by the local processing unit 28 of signal data from the foregoing sensors indicative of a system malfunction.

While the subject invention has been described in conjunction with preferred embodiments, it is to be understood and appreciated that the protection to be afforded the invention is defined by the accompanying claims and functional equivalents thereof, rather than by the specific features of the foregoing detailed description and accompanying drawings.

What is claimed is:

1. A flashover simulation system for use with a firefighter trainer, comprising:
   a generally enclosed burn room having a main burner mounted therein;
   at least one auxiliary burner positioned adjacent to a ceiling of the burn room, the auxiliary burner being selectively operable to burn fuel supplied thereto from a fuel reservoir;
   a fuel ignitor positioned adjacent to the auxiliary burner; and
   control means operable to effect fuel delivery to said auxiliary burner independently of fuel delivery to the main burner, wherein said control means comprises valve means associated with each of said main and auxiliary burners, said valve means being controllable independently of one another in accordance with signal input received from said control means.

2. The flashover simulation system of claim 1, further comprising means for sensing at least one predetermined firefighter trainer operational parameter.

3. The flashover simulation system of claim 2, wherein said sensed operational parameter comprises air temperature.

4. The flashover simulation system of claim 2, wherein said sensing means comprises a thermocouple.

5. The flashover simulation system of claim 2, wherein said sensed operational parameter comprises flame height from said main burner.

6. The flashover simulation system of claim 2, wherein said control means comprises an automated processing unit operable to generate signal output to said valve means to control operation of said valve means in accordance with said at least one sensed operational parameter.

7. The flashover simulation system of claim 6, wherein said control means further comprises means for applying operational parameter threshold data as an input to said automated processing unit.

8. The flashover simulation system of claim 7, wherein said control means is operable to enable flashover simulation at said auxiliary burner upon receipt at said control means of signal data corresponding to said sensed operational parameter that is of a magnitude at least as great as that representative of said threshold value.

9. The flashover simulation system of claim 8, wherein said control means further comprises a flashover actuation switch that is operable upon receipt of a flashover enablement signal.

10. The flashover simulation system of claim 9, wherein said flashover actuation switch is located at a position geographically remote from said automated processing unit.

11. The flashover simulation system of claim 1, further comprising ignitor sensing means operable to monitor spark emissions from said auxiliary burner ignitor and to transmit an output signal indicative of ignitor operation to said control means, said control means being operable to terminate fuel flow to said at least one auxiliary burner upon receipt of a signal from said ignitor sensing means indicative of an ignitor malfunction.

12. A method for simulating a flashover condition in a firefighter trainer having a generally enclosed burn room, the method comprising the steps of:
producing a flame near the floor of the burn room to simulate a primary fire;
monitoring at least a single firefighter operational parameter; and
producing a second flame near the ceiling of the burn room in accordance with attainment of a predetermined threshold value of said monitored operational parameter.

13. The method of claim 12, wherein said flame is directed along a path generally parallel to the ceiling of the burn room.

14. The method according to claim 12, wherein said monitored operational parameter comprises the temperature of air adjacent the ceiling of the room.

15. The method according to claim 12, wherein said monitored operational parameter comprises the height of flames emanating from a burner located near the floor of the burn room.

16. The method according to claim 12, further comprising the step of implementing fuel flow to the burn room following generation of a preliminary fuel flow enablement signal.

17. The method according to claim 16, wherein said fuel flow implementation is accomplished following actuation of a manually-operable switch.

18. The method according to claim 17, wherein said manually-operable switch is located within the firefighter trainer burn room.

19. The method according to claim 12, wherein the predetermined operational parameter threshold value is applied as an input into an operator console of a data processing unit that is operable to receive said sensed operational parameter and automatically generate said fuel flow enablement signal once said threshold value has been attained.

20. The method according to claim 21, wherein said monitored operational parameters comprise main burner flame height and air temperature adjacent the room ceiling, the data processing unit being operable to generate said fuel flow enablement signal only after pre-established threshold values for each of said operational parameters have been attained.

21. The method of claim 12, further comprising the step of limiting fuel flow to said auxiliary burner for an operator-selectable length of time.

22. A flashover simulation system for use with a firefighter trainer, comprising:
a generally enclosed burn room having a main burner mounted therein;
at least one auxiliary burner positioned adjacent to a ceiling of the burn room, the auxiliary burner being selectively operable to burn fuel supplied thereto from a fuel reservoir;
a fuel ignitor positioned adjacent to the auxiliary burner to ignite fuel delivered to said auxiliary burner;
means for sensing air temperature adjacent to the burn room ceiling and generating a digital signal indicative of said sensed temperature;
control means comprising an automated data processing unit operable to receive said digital signal and generate a flashover enablement signal when said sensed air temperature attains a predetermined threshold value; and
means for sensing flame height from the main burner and generating a signal representative thereof for communication to said processing unit, said flashover enablement signal being generated once each of said signals representative of said sensed temperature and flame height parameters has exceeded its respective predetermined threshold value.

23. The flashover simulation system of claim 22, wherein said flashover enablement signal is generated only after said signals representative of said sensed temperature and flame height parameters substantially simultaneously each exceed their respective threshold values.

24. The flashover simulation system of claim 22, wherein said control means comprises a valve assembly mounted along a fuel flow path to each of said main and auxiliary burners, said valve assembly being independently controllable in accordance with signal input received from said processing unit to vary fuel flow along the respective paths.

25. The flashover simulation system of claim 24, wherein said valve assembly comprises a motorized linear valve.

26. The simulation system of claim 22, wherein said control means further comprises a flashover actuation switch that is operable upon receipt of said flashover enablement signal.

* * * * *